Jan. 8, 1963   J. A. LUCEY   3,072,780
ELECTRIC ARC WELDING
Filed Aug. 11, 1960   2 Sheets-Sheet 1

United States Patent Office 3,072,780
Patented Jan. 8, 1963

3,072,780
ELECTRIC ARC WELDING
John A. Lucey, Newcastle-upon-Tyne, England, assignor to The British Oxygen Company Limited, a British company
Filed Aug. 11, 1960, Ser. No. 49,019
Claims priority, application Great Britain Aug. 14, 1959
2 Claims. (Cl. 219—125)

This invention relates to electric arc welding and to arc-welding apparatus in which a welding head and the work to be welded are caused to move relatively to each other by mechanical means. This invention is in the nature of an improvement in or modification of the invention disclosed in copending patent application Serial No. 840,310 now Patent 3,005,901 which is owned by the assignee of the present application.

In the copending patent application hereinbefore mentioned there is described an automatic arc-welding apparatus, and its method of use, which is particularly suitable for use where a succession of relatively short weld runs have to be laid down. In operation of that apparatus, relative movement between an arc-welding head and the workpiece or workpieces is effected at welding speed during each welding operation, and at welding speed or a faster speed between welding operations and this relative movement is halted for predetermined periods at the commencement and the end of each welding operation. In said copending patent application we have described the control of this relative movement by photoelectric means responsive to light reflected off the work.

tI should be understood however, that other control means are suitable for this purpose so far as the present invention is concerned. Thus a mechanically operated cam system may be used. Limit switches mounted in the path of a moving member of the apparatus may be operated to halt the relative movement, or alter the speed of relative movement as required. In general the work will be stationary and the control of relative movement will be obtained by halting or altering the speed of the arc-welding head.

The present invention enables welds to be produced with little or no cratering at the ends of the joints without using "run-on" and "run-off" plates as has previously been necessary.

According to the present invention, in a method of electric arc welding a succession of spaced butt joints extending in line in which relative movement in a straight line between an arc welding head and the work is effected at welding speed during the welding operation on each joint, and at welding speed or a faster speed between welding operations, this relative movement being halted for predetermined periods at the commencement and at the end of the welding operation on each joint, a welding arc being struck to the work from a continuous electrode during the predetermined period at the commencement of each welding operation, and the welding arc being extinguished during the predetermined period att he end of each welding operation, the welding arc is struck to the work at a short distance from the beginning of each joint and weld metal is allowed to run back to the beginning of the joint where it is suitably supported until solidified, and the relative movement during each welding operation is terminated before the welding arc reaches the end of the joint, and weld metal is allowed to run to the end of the joint where it is suitably supported until solidified.

The support for the weld metal may be provided by a mass of granulated slag forming welding composition which extends to the upper surface of the work and is confined between the beginning or end of the joint and a damming member.

Arc welding apparatus for use in this method of electric arc welding may include a backing bar arranged to extend behind the joints to be welded, and a plurality of damming blocks arranged to be supported on the backing bar, one at each end of each joint to be welded, to support a pile of granulated welding composition in contact with the end of each joint to be welded.

The invention may be applied to the fabrication of structural sections, such as castellated beams, and this application will now be described by way of example with reference to the four figures of the accompanying drawings in which.

Figure 1:
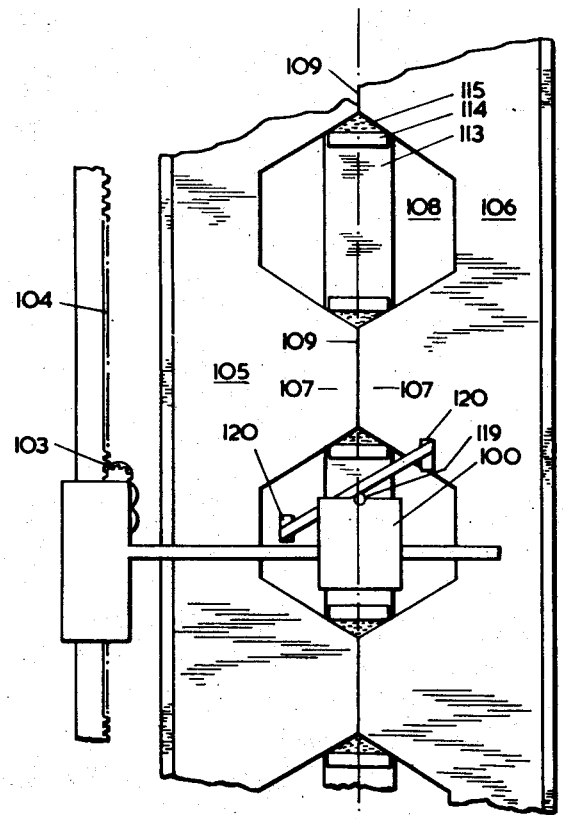
FIGURE 1 is a plan view of a castellated beam set up for welding by an automatic arc-welding apparatus.

Referring now to the drawings, and to FIGURE 1 in particular, a castellated beam is fabricated from a steel beam of "I" cross-section by cutting through the web of the beam to divide the beam longitudinally into two halves 105 and 106 having interfitting castellations. The two halves of the beam are separated and then displaced longitudinally so that the prominences 107 of the two sets of castellations abut one another and the indentations are separated by openings 108 in the castellated beam so formed. In this particular construction, the castellations taper towarbds their prominences, the sides of the castellations making an angle of 60° with the longitudinal axis of the beam.

Figure 4:
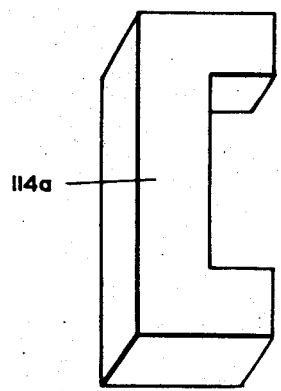
FIGURE 4 shows a perspective view of a recessed damming member for use where the castellations are rectangular.
Figure 2:
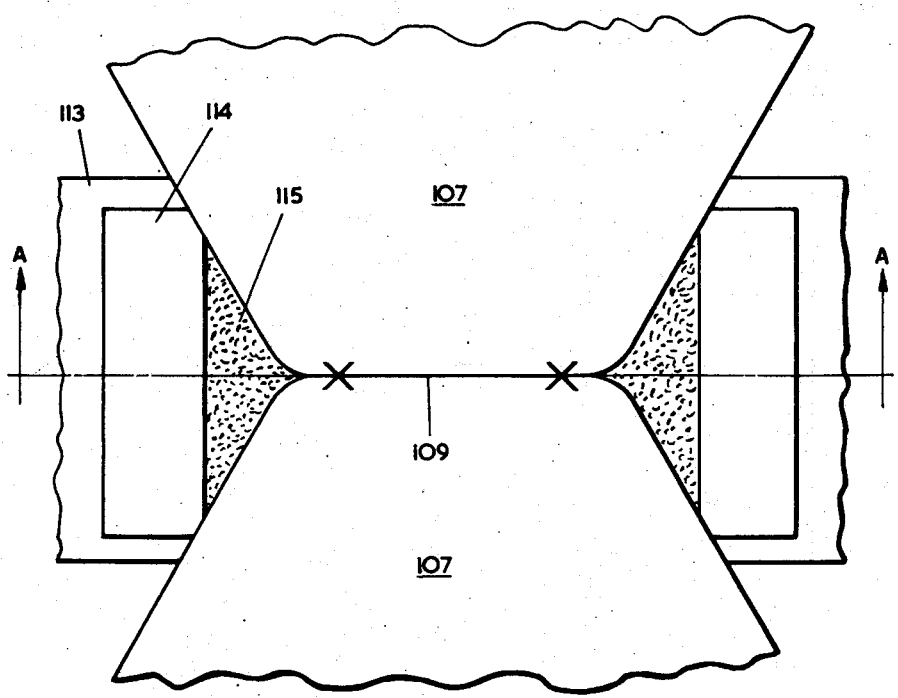
FIGURE 2 is a plan view of one joint of the castellated beam with backing bar and damming members in position, drawn to a larger scale.
Figure 3:
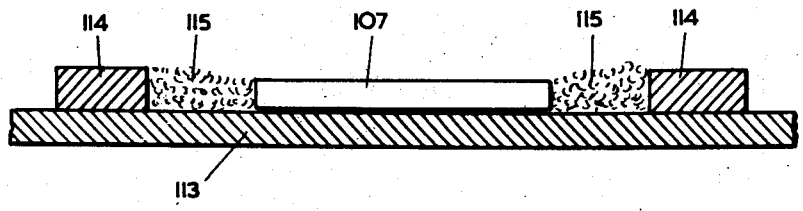
FIGURE 3 is a section on the line A—A in FIGURE 2.

The abutting faces of the two sets of castellations provide a succession of spaced relatively short joints 109 extending in line along the beam. For welding, the beam is supported with its web extending horizontally and the abuting faces in a generally vertical plane. Below, and extending beyond the end of each joint, as can also be seen in FIGURES 2 and 3, is a backing bar 113 of copper or similar material, and carried on this backing bar at each end of each joint is a damming block of copper 114 or similar material. Each damming block is of approximately the thickness of the web of the beam and is shaped to support a pile of granulated slag forming welding composition 115 in contact with the end of the joint 109 and with the castellations in proximity to the joint. Thus when welding tapering castellations a rectangular damming block may be used as shown in FIGURES 1, 2 and 3, whereas with square or rectangular castellations the damming block would have to be recessed, as 114a in FIGURE 4, to accommodate the necessary pile of granulated welding composition.

The space between each damming block 114 and the associated castellations is filled with a granulated slag forming welding composition such as is used in submerged arc welding, this filling being carried out before an arc welding head is moved along the beam or, as is normal with submerged arc welding, by deposition from a hopper moving ahead of the the arc welding head during welding.

Referring to FIGURE 1, welding of the joints is effected by moving an arc welding head 100 over the beam and depositing weld metal from a continuous electrode which is fed automatically through the nozzle 119 of an arc welding head 100 to a welding arc struck between the end of the electrode and the beam. To commence welding, the nozzle 119 of the arc welding head is automatically moved into position above the end joint of the beam by drawing pinion 103 engaging a rack 104, halting of the arc welding head in this position being effected preferably by photo-electric means 120 responsive to light reflected from the work as described in copending British patent application hereinbefore mentioned but alternatively by a mechanically operated cam system or by photo-electric means scanning a suitable pattern. The electrode is fed forward towards the beam and the welding arc is established instantaneously with the aid of a high frequency voltage arc-starting technique. It should be noted that the welding arc is struck to the work at a short distance from the beginning of the joint, as indicated by the crosses in FIGURE 2. A distance of a quarter of an inch may be suitable in some instances. The arc welding head 100 remains stationary for a predetermined interval, the duration of this dwell period being such as to allow molten weld metal to flow back to the beginning of the joint 109. Cratering of the beginning of the weld is avoided by this technique and the molten weld metal is adequately supported and moulded by the pile of granulated welding composition 115 which fuses and forms a slag and is disposed between the end of the joint 109 and the damming block 114.

At the end of the dwell period the arc-welding head 100 is caused to move along the joint 109 at welding speed and to deposit weld metal in the joint. When the arc-welding head approaches the end of this joint the photo-electric or other control means halts the relative movement between this head and the work so that the welding arc strikes the work a short distance from the end of the joint and remains at this point until extinguished. A distance of a quarter of an inch may again be suitable. The electrode feed is interrupted after the traversing movement of the arc welding head has ceased and the welding arc is then allowed to burn back the electrode before the welding current is interrupted. Granulated welding composition confined between the end of the joint 109 and a damming block 114 supports the molten weld metal in the joint, and the combined effect of this support and of allowing the electrode to burn back results in the production of a satisfactory weld without cratering. It will be seen that the technique described above avoids the use of "run-on" and "run-off" plates at the commencement and end of each weld.

When the dwell period at the end of the welding of this joint has been completed, the arc-welding head 100 may be caused to traverse the opening between the welded castellation and the next at high speed and then to repeat the operation described above. This is repeated until the joints have all been welded from one side. The beam is reversed and welding of each of the joints is repeated from the other side of the web. Welds giving full fusion along the full length of each joint have been obtained in this manner on girders having webs varying in thickness from ¼ inch to ⅝ inch using welding currents from 450 to 1200 amperes direct current from a source of drooping volt-ampere characteristic during submerged arc welding at speeds from 15 to 36 inches per minute.

I claim:

1. A method of electric arc welding a succession of spaced butt joints extending in line in which relative movement in a straight line between an arc welding head and the work is effected during the welding operation on each joint and between welding operations, this relative movement being halted for predetermined periods at the commencement and at the end of the welding operation on each joint, a welding arc being struck to the work from a continuous electrode during the predetermined period at the commencement of each welding operation, and the welding arc being extinguished during the predetermined period at the end of each welding operation, wherein the welding arc is struck to the work at a short distance from the beginning of each joint and weld metal is allowed to run back to the beginning of the joint against a support until solidified, and wherein the relative movement during each welding operation is terminated before the welding arc reaches the end of the joint, and weld metal is allowed to run to the end of the joint where it is suitably supported until solidified, wherein said support for said weld metal is a mass of granulated slag forming welding composition which extends to the upper surface of the work and is confined between the beginning, and the end, of the joint and a damming member.

2. In arc welding apparatus for automatically welding a succession of spaced butt joints extending in line between workpieces and comprising an arc welding head having a nozzle through which a continuous welding electrode may be fed to a welding arc struck to the workpieces, means for moving the arc welding head along the workpieces above the butt joints, and control means for halting the arc welding head at a point removed from the begining and end of each joint for predetermined periods, the improvement which consists in a backing bar below each workpiece and extending beyond the ends of each joint, and damming members of approximately the thickness of the workpieces disposed at each end of each joint on the backing bar, each damming member supporting a mass of granulated slag-forming welding composition against the end of the joint and between the backing bar and the upper surface of the workpiece.

References Cited in the file of this patent

UNITED STATES PATENTS

| | | |
|---|---|---|
| 1,831,343 | Caldwell | Nov. 10, 1931 |
| 2,152,785 | Blankenbuehler | Apr. 4, 1939 |
| 2,241,572 | Armstrong | May 13, 1941 |
| 3,005,901 | King | Oct. 24, 1961 |